United States Patent
Grost et al.

(10) Patent No.: US 9,172,784 B2
(45) Date of Patent: Oct. 27, 2015

(54) VEHICLE SYSTEM FOR MANAGING EXTERNAL COMMUNICATION

(75) Inventors: Timothy J. Grost, Clarkston, MI (US); Cody R. Hansen, Shelby Township, MI (US); Matthew M. Highstrom, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 13/211,645

(22) Filed: Aug. 17, 2011

(65) Prior Publication Data

US 2013/0045689 A1 Feb. 21, 2013

(51) Int. Cl.
| H04M 1/00 | (2006.01) |
| H04B 7/00 | (2006.01) |
| H04M 1/60 | (2006.01) |
| H04M 1/725 | (2006.01) |

(52) U.S. Cl.
CPC ........ *H04M 1/6091* (2013.01); *H04M 1/72577* (2013.01)

(58) Field of Classification Search
CPC ....... G06F 3/0484; G06F 17/00; H04L 67/12; H04L 67/18; H04W 4/008; H04W 52/244; H04W 52/42; H04W 84/005; H04W 84/045; B60R 25/24; B60R 2325/105; B60R 2325/205; B60R 25/045; G07C 9/00309
USPC .......................... 455/569.1, 569.2, 41.3, 41.2
See application file for complete search history.

(56) References Cited

U.S. PATENT DOCUMENTS

| 2003/0114202 | A1 | 6/2003 | Suh et al. | |
| 2007/0140187 | A1* | 6/2007 | Rokusek et al. | 370/338 |
| 2007/0265040 | A1* | 11/2007 | Matsui | 455/575.9 |
| 2008/0254746 | A1 | 10/2008 | Krishnan et al. | |
| 2009/0002147 | A1 | 1/2009 | Bloebaum et al. | |
| 2010/0216509 | A1 | 8/2010 | Riemer et al. | |
| 2011/0077032 | A1 | 3/2011 | Correale et al. | |
| 2011/0143719 | A1* | 6/2011 | Jung et al. | 455/412.1 |
| 2011/0257973 | A1* | 10/2011 | Chutorash et al. | 704/235 |
| 2012/0244883 | A1* | 9/2012 | Tibbitts et al. | 455/456.2 |

FOREIGN PATENT DOCUMENTS

| DE | 10134098 C2 | 12/2003 |
| DE | 102009018074 A1 | 12/2009 |
| WO | 2006040951 A1 | 4/2006 |

OTHER PUBLICATIONS

DE Office Action dated Feb. 21, 2013 for German Patent Application No. 10 2012 214 436.6.
Chinese Office Action for Application No. 201210293815.4 dated Aug. 5, 2014; 5 pages.

* cited by examiner

*Primary Examiner* — Ping Hsieh
*Assistant Examiner* — Xin Jia
(74) *Attorney, Agent, or Firm* — Cantor Colburn LLP

(57) ABSTRACT

A hands-free system for a vehicle is provided, where the hands-free system sends and receives communication from a personal electronic device. The hands-free system includes a vehicle control module that is in communication with at least one vehicle system for determining if the vehicle is in a condition to receive input regarding operation, a display, and a hands-free control module. The hands-free control module is in communication with the display and the vehicle control module. The hands-free control module is in communication with the personal electronic device for sending and receiving an external communication from the personal electronic device. The hands-free control module has a memory and a message delivery filter algorithm.

20 Claims, 2 Drawing Sheets

VEHICLE SYSTEM FOR MANAGING EXTERNAL COMMUNICATION

FIELD OF THE INVENTION

Exemplary embodiments of the invention relate to a hands-free system for a vehicle and, more particularly, to a hands-free system having a hands-free control module with control logic for determining if an external communication contains a break-through string.

BACKGROUND

Some drivers may use their portable electronic communication devices while operating a vehicle. For example, some drivers use their smartphones to make telephone calls and send text messages while driving. However, some jurisdictions have prohibited the use of portable communication devices while driving unless a hands-free adapter is used.

In an effort to reduce distractions while driving, a driver may choose to turn off or set the portable electronic communication device to silent mode, thereby ignoring all calls and text messages. However, when using this approach an important call or text message may be missed. For example, during severe weather a driver may miss a call or text message warning him or her of an emergency or dangerous situation. Accordingly, it is desirable to provide an approach for ignoring some calls and text messages while driving, while still having the ability to receive selected calls and text messages that may be important to a driver.

SUMMARY OF THE INVENTION

In one exemplary embodiment of the invention, a hands-free system for a vehicle is provided, where the hands-free system sends and receives communication from a personal electronic device. The hands-free system includes a vehicle control module that is in communication with at least one vehicle system for determining if the vehicle is in a condition to receive input regarding operation, a display, and a hands-free control module. The hands-free control module is in communication with the display and the vehicle control module. The hands-free control module is in communication with the personal electronic device for sending and receiving an external communication from the personal electronic device. The hands-free control module has a memory and a message delivery filter algorithm.

The hands-free control module includes control logic for monitoring the vehicle control module for a driving data signal indicating the vehicle is in the condition to receive input regarding operation. The hands-free control module includes control logic for monitoring the personal electronic device for the external communication. The hands-free control module includes control logic for receiving the external communication from the personal electronic device. The hands-free control module includes control logic for determining if the external communication contains a break-through string. The break-through string indicates that the external communication is to be shown on the display even if the vehicle is in the condition to receive input regarding operation. The hands-free control module includes control logic for sending a display data signal to the display for generating graphical images that are shown on the display indicating the content of the external communication. The display data signal is sent if the external communication contains the break-through string. The hands-free control module includes control logic for storing the external communication in the memory of the control module if the external communication does not contain the break-through string and if the vehicle control module sends the driving data signal indicating the vehicle is in the condition to receive input regarding operation.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
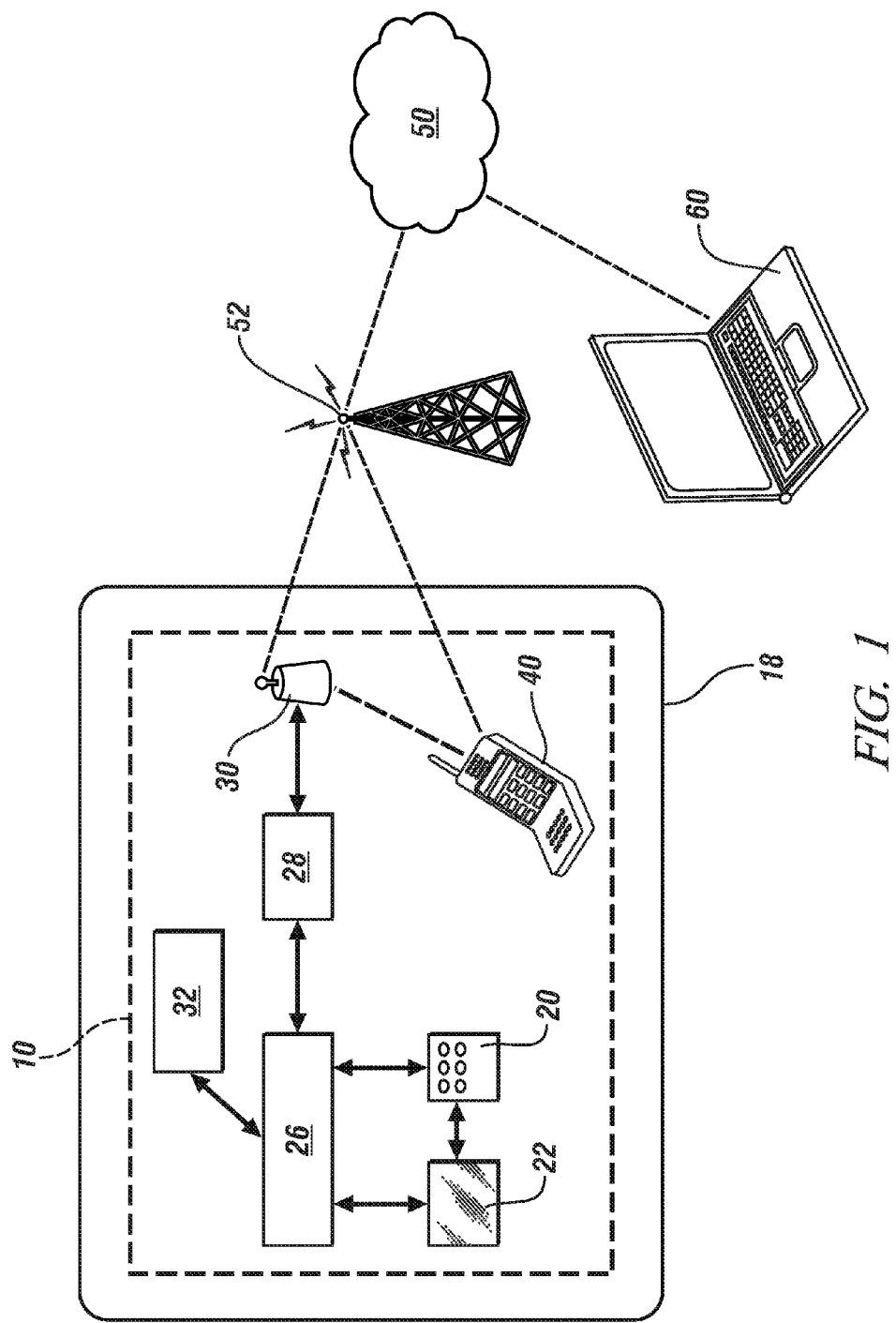
FIG. 1 is a schematic diagram of an exemplary hands-free system in a vehicle.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a hands-free system 10 employed in a vehicle 18. The hands-free system 10 includes a user input 20, a display 22, a hands-free control module 26, a transceiver 28, an antenna 30, and a vehicle control module 32. The hands-free system 10 is in communication with a personal electronic device 40 for sending and receiving external communication. The external communication may be, for example, in the form of a text message, voice call, or an Internet based message application. The Internet based message may be a message sent over an Internet application such as, for example, Facebook. In the exemplary embodiment as shown, the hands-free control module 26 is in communication with the proximate personal electronic device 40 through the transceiver 28 and the antenna 30 by a short-range wireless connection. The short range wireless connection is typically any type of wireless signal for exchanging data over distances typically under about 10 meters such as, for example, a Bluetooth® signal conforming to IEEE Standard 802.15 or a Wi-Fi® signal conforming to IEEE standard 802.11. Alternatively, in another embodiment the hands-free system 10 may be in communication with the personal electronic device 40 through a cable or data link connection as well.

The personal electronic device 40 is typically any type of portable electronic device that is in communication with a network 50 for receiving the external communication. In one embodiment, the network 50 is a cellular network that includes several cellular sites 52 where antennas and electronic communications equipment are placed. Alternatively, in another embodiment the network 50 may be a Wi-Fi® network. The personal electronic device 40 may have text communication service capabilities for receiving text messages such as, for example, Short Message Service ("SMS")

messages. The personal electronic device 40 may include voice call service capabilities for receiving telephone calls. In one embodiment, the personal electronic device 40 may include the capability to browse the Internet as well. For example, in one embodiment, the personal electronic device 40 may be a smartphone.

The user input 20 typically includes a keypad or a keyboard for allowing a user to input information. In one embodiment, the display 22 is a liquid crystal display ("LCD") screen, and is used to display graphics and text. In one example, the user input 20 and the display 22 are a combined unit, where the display is a touchscreen that detects the presence and location of a user's touch. The hands-free control module 26 is in communication with the user input 20, the display 22, the transceiver 28, the antenna 30, and the vehicle control module 32. Although FIG. 1 illustrates the transceiver 28 and the antenna 30 as separate components from the hands-free control module 26, it is to be understood that the transceiver 28 and the antenna 30 may also be integrated with the hands-free control module 26 as well. The hands-free control module 26 is typically any type of control module that connects the vehicle 18 to the personal electronic device 40. For example, in one embodiment the hands-free control module 26 is an infotainment control module.

The vehicle control module 32 is in communication with at least one vehicle system or subsystem for receiving communication that indicates if the vehicle 18 is in a condition to receive input regarding operation. Specifically, the vehicle control module 32 receives input from one or more vehicles systems to determine if the vehicle 18 is in a state to receive manipulation from a driver to operate the vehicle 18. In one embodiment, the indication that the vehicle control module 32 receives from a vehicle system may be a data signal indicating that the vehicle 18 is either being driven, or is in a state where an operator may drive the vehicle 18. For example, in one embodiment, the vehicle control module 32 is a transmission control module, and is in communication with a plurality of driver intent sensors (not shown) for determining the position of a shift lever (not shown). In this example, the vehicle control module 32 sends a driving data signal to the hands-free control module 26 indicating that the vehicle 18 is being driven unless the driver intent sensors indicate that the shift lever is in a park ("P") position, which indicates that the vehicle 18 may be driven. Alternatively, in another embodiment, the vehicle control module 32 is an engine control module that is in communication with a wheel speed sensor (not shown). The wheel speed sensor sends the engine control module data indicating the wheel speed. The engine control module includes control logic for determining the speed of the vehicle 18 based on wheel speed. In this embodiment, the vehicle control module 32 sends a driving data signal to the hands-free control module 26 indicating that the vehicle 18 is being driven at a specific speed, and indicates that the vehicle 10 is being driven.

The hands-free control module 26 includes control logic for monitoring the personal electronic device 40 for external communication. The hands-free control module 26 further includes control logic for sending a display data signal to the display 22. The display data signal generates graphical images on the display 22 indicating the content of the external communication received from the personal electronic device 40. For example, in the event the external communication is a text message, then the hands-free control module 26 includes control logic for generating graphical images on the display 22 indicating the content of the text message on the display 22. Alternatively, in another embodiment, if the external communication is a telephone call, then the hands-free control module 26 includes control logic for generating graphical images on the display 22 indicating the telephone number or name of the caller. In one embodiment, the hands-free control module 26 may also include control logic for integrating voice calls from the personal electronic device 40 into an in-vehicle audio system (not shown). Specifically, the hands-free control module 26 includes control logic for sending an audio data signal to the in-vehicle audio system. The audio data signal is received by the personal electronic device 40 through the network 50.

The hands-free control module 26 includes a memory and a message delivery filter algorithm. The message delivery filter algorithm is employed to selectively block or suppress the hands-free control module 26 from sending the display data signal to the display 22 such that graphical images indicating the content of the external communication are not shown on the display 22. Specifically, the message delivery filter algorithm blocks or suppresses external communication from the personal electronic device from being shown on the display 22 in the event the vehicle 18 is in a condition to receive input regarding operation. The message delivery filter algorithm may also block the hands-free control module 26 from sending the audio data signal that represents a voice call through the in-vehicle audio system as well.

The message delivery filter algorithm of the hands-free control module 26 includes control logic for monitoring the user input 20 for an input entered by a vehicle occupant. Specifically, the hands-free control module 26 includes a password that is stored in the memory of the hands-free control module 26. The password is typically a numeric or alphanumeric code that the user enters by manipulating the user input 20. In one exemplary embodiment, the password is a four digit number. The hands-free control module 26 further includes control logic for comparing the input entered by the vehicle occupant with the password that is stored in the memory. In the event that the input and the password are identical, then the hands-free control module 26 includes control logic for activating the message delivery filter algorithm. Alternatively, in another embodiment, the message delivery filter algorithm may be activated remotely. Specifically, FIG. 1 illustrates a remote computing device 60 that is in communication with the network 50. The remote computing device 60 may be, for example, a personal computer. The hands-free control module 26 is wirelessly connected to the network 50. The message delivery filter algorithm is activated when the remote computing device 60 sends a data signal over the network 50 indicating activation. For example, in one embodiment, a parent of a young adult may activate the message delivery filter algorithm remotely at home through an Internet website by using the remote computing device 60.

In one embodiment, the message delivery algorithm may also only block a certain type of external communication. For example, in one embodiment, the message delivery algorithm may only block text messages, but still generates graphical images on the display 22 indicating the telephone number or name of the caller. In one embodiment, the type of external communication that is selectively blocked is selected by a vehicle occupant using the user input 20. Alternatively, in another embodiment, the type of external communication that is selectively blocked may be activated remotely by the remote computing device 60.

The hands-free control module 26 includes control logic for monitoring the vehicle control module 32 for the driving data signal indicating that the vehicle 18 is in a condition to receive input regarding operation. For example, in one embodiment if the vehicle control module 32 is a transmission control module, then the control module 26 sends the driving data signal to the hands-free control module 26 indicating that the vehicle 18 is in a condition to receive input regarding operation unless the driver intent sensors indicate that the shift lever is in a park "P" position. Alternatively, in another embodiment, the vehicle control module 32 is an engine control module that is in communication that indicates vehicle speed. If the vehicle speed is above a threshold value, then the hands-free control module 26 determines that the vehicle 18 is being driven. For example, in one embodiment, the threshold value may be about 8 kph (about 5 mph), however it is understood that other values may be used as well.

The hands-free control module 26 includes control logic for monitoring the personal electronic device 40 for external communications. Specifically, the hands-free control module 26 monitors external communications for a break-through string. The break-through string may be a keyword such as, for example, a word like "tornado" or a string of words such as "this is important, call your mother back". In one embodiment, the break-through string is a word or string of words located in the subject line or the body of a text message or an Internet based message application. Alternatively, in another embodiment, the break-through string may be a contact's name that is pre-programmed into the memory of the personal electronic device 40. For example, the break-through string may be the name "Fred" stored in the memory of the personal electronic device 40. In yet another embodiment, the break-through string may be a telephone number such as, for example, a 10 digit telephone number (i.e. 555-555-1212), or a code that is issued by the National Weather Service. The break-through string is an indication that the external communication is to be shown on the display 22 even though the message delivery filter algorithm is activated. In the event that the message delivery filter algorithm is activated and the external communication does not contain the break-through string, then the hands-free control module 26 includes control logic for storing the external communication in the memory of the control module. The external communication is suppressed or blocked until the hands-free control module 26 receives communication from the vehicle control module 32 indicating that the vehicle 18 is no longer in a condition to receive input regarding operation.

In one exemplary embodiment, the hands-free control module 26 includes control logic for monitoring the user input 20 for an input entered by a vehicle occupant indicating the break-through string. For example, a vehicle occupant may enter the break-through string such that only an external communication from a specific telephone number (i.e. such as a telephone number as in 555-555-1212) is shown on the display 22 when the message delivery filter algorithm is activated. Alternatively, in another embodiment, the break-through string is entered using the remote computing device 60.

In one embodiment, the hands-free control module 26 may include control logic for sending a text message or a pre-recorded telephone call back to the personal electronic device 40 indicating that the driver of the vehicle 18 is currently unavailable in the event that the external communication does not contain the break-though string. Specifically, the hands-free control module 26 includes control logic for sending a data signal back to the personal electronic device 40 indicating that the driver of the vehicle 18 is unavailable. The data signal is then sent over the network 50. For example, in the event a telephone call is made to the personal electronic device 40 while a driver is operating the vehicle 18, the hands-free control module 26 includes control logic for sending a pre-recorded message back to the caller indicating that the driver is unavailable, and will return their call as soon as possible. In the event that a text message or an Internet based message application is sent to the personal electronic device 40, the hands-free control module 26 includes control logic for sending a pre-programmed text message indicating that the driver is unavailable and will return the text as soon as possible.

In yet another embodiment, the hands-free control module 26 also includes control logic for monitoring various control modules or vehicle systems (not shown) located within the vehicle 18 for various driving conditions as well. The hands-free control module 26 includes control logic for activating the message delivery filter algorithm depending on the various driving conditions. For example, in one embodiment the hands-free control module 26 includes control logic for monitoring a global positioning satellite (GPS) control module (not shown) for determining the specific location of the vehicle 18. The hands-free control module 26 includes control logic for activating the message delivery filter algorithm in the event that the vehicle 18 is located within an indicated area. For example, in one embodiment, the message delivery filter algorithm may only be activated in the event the driver is operating the vehicle 18 within an inner city limit. In another embodiment, the hands-free control module 26 includes control logic for activating the message delivery filter algorithm in the event the GPS control module indicates that the vehicle 18 is approaching a maneuver or intersection that typically requires greater concentration by a driver.

Alternatively, in another embodiment, the hands-free control module 26 includes control logic for activating the message delivery filter algorithm during specific ambient conditions. For example, in one embodiment, the hands-free control module 26 includes control logic for activating the message delivery filter algorithm in the event there is snow or rain present as the vehicle 18 is being operated. In yet another embodiment, the hands-free control module 26 includes control logic for activating the message delivery filter algorithm if the vehicle control module 32 indicates the vehicle speed exceeds a specified value. In one embodiment, the hands-free control module 26 may be in communication with a cruise control module (not shown), where the hands-free control module 26 includes control logic for activating the message delivery filter algorithm in the event the cruise control module indicates that cruise control is not activated.

In another embodiment, the hands-free control module 26 includes control logic for monitoring a control module (not shown) in the vehicle 18 that detects the presence of passengers in the vehicle 18. The hands-free control module 26 also includes control logic for activating the message delivery filter algorithm in the event passengers are present within the vehicle 18. In yet another embodiment, the hands-free control module 26 is in communication with a park assist control module (not shown), where the hands-free control module 26 includes control logic for monitoring the park assist control module for a data signal indicating if there are other vehicles in the proximity of the vehicle 18. The hands-free control module 26 may include control logic for activating the message delivery filter in the event another vehicle is located within proximity of the vehicle 18 as detected by the park assist control module. In another embodiment, the hands-free control module 26 includes control logic for monitoring an adaptive cruise control ("ACC") system control module or a collision mitigation braking system ("CMB") control module (not shown) that detects other vehicles located in front of the vehicle 18 during driving. The hands-free control module 26 includes control logic for activating the message delivery filter in the event another vehicle is located within proximity of the vehicle 18 as detected by the ACC or the CMB module.

In another embodiment, the hands-free control module 26 includes control logic for activating the message delivery filter algorithm depending on the time of day. For example, the message delivery filter algorithm may be activated only at nighttime (after 9 pm). In another embodiment, the hands-free control module 26 includes control logic for activating the message delivery filter algorithm depending on usage of the personal electronic device 40. Specifically, the message delivery filter algorithm may be activated depending on if a user is already using the personal electronic device 40. For example, in one embodiment the hands-free control module 26 may include control logic for blocking text messages in the event the personal electronic device 40 is being used for a telephone call.

The hands-free system 10 as described above provides a driver with an alternative to turning off or setting his or her portable electronic device 40 to silent mode during driving, which ignores all calls and text messages. Ignoring all calls and messages may result in an important call or text message being missed such as, for example, a call or text message warning of an emergency or dangerous situation. The hands-free system 10 filters only some types of calls and messages, while still allowing other types of calls and text messages that are deemed to be of an urgent or important nature to reach a driver of the vehicle 18.

Figure 2:
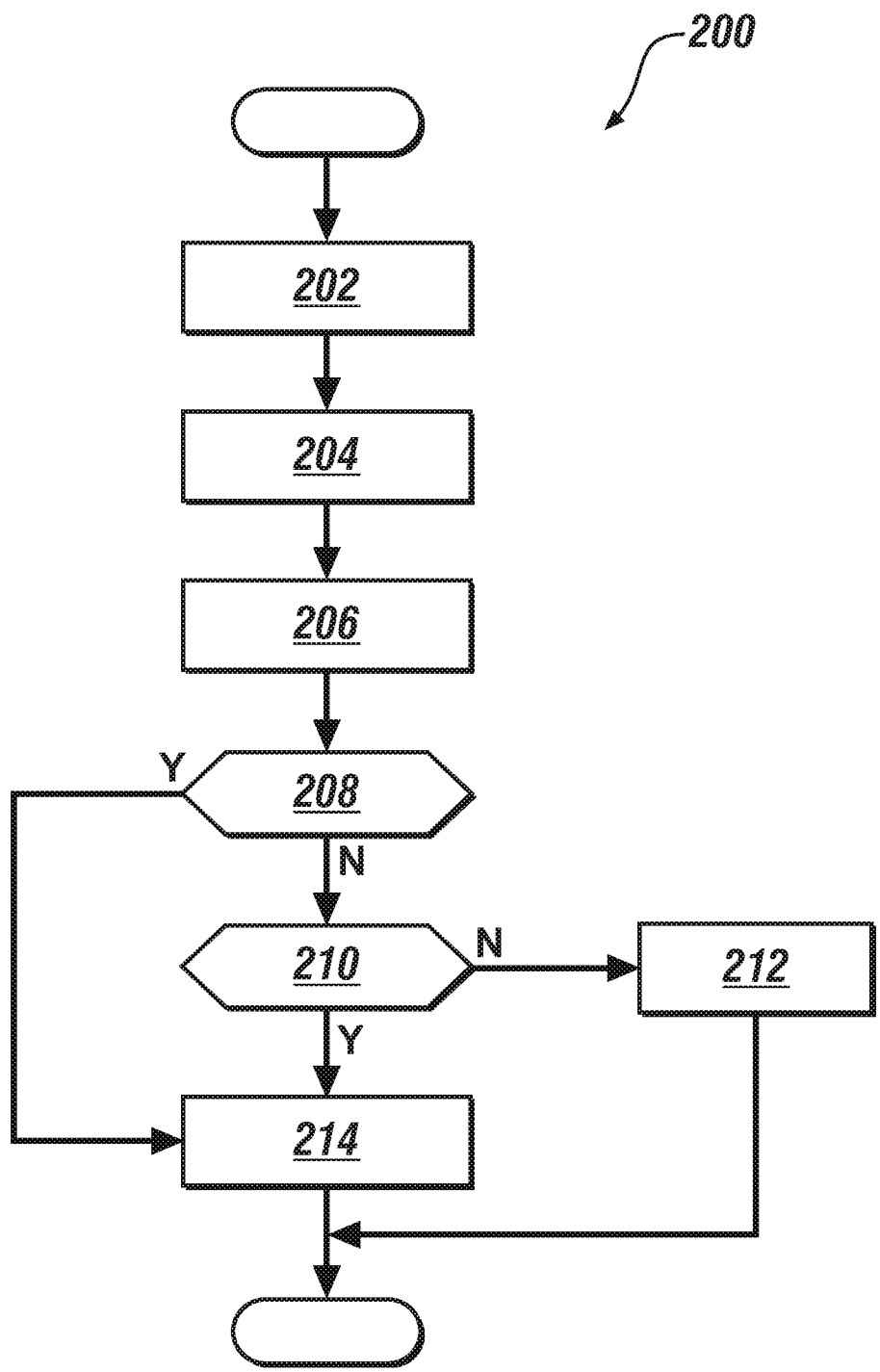
FIG. 2 is a process flow diagram illustrating a method of operating the hands-free system in FIG. 1.

A method of operating the hands-free system 10 will now be explained. Referring to FIG. 2, an exemplary process flow diagram illustrating an exemplary process of operating the hands-free system 10 is generally indicated by reference number 200. Process 200 begins at step 202, where a hands-free control module 26 includes control logic for determining if a message delivery filter algorithm is activated. For example, in one embodiment the message delivery filter algorithm of the hands-free control module 26 includes control logic for monitoring the user input 20 for an input entered by a vehicle occupant. Specifically, the hands-free control module 26 includes a password that is stored in the memory of the hands-free control module 26. In the event that the input and the password are identical, then the hands-free control module 26 includes control logic for activating the message delivery filter algorithm. Alternatively, in another embodiment, the message delivery filter algorithm may be activated remotely. Specifically, FIG. 1 illustrates a remote computing device 60 that is in communication with the network 50. The message delivery filter algorithm is activated when the remote computing device 60 sends a data signal over the network 50 indicating activation. Method 200 may then proceed to step 204.

In step 204, the hands-free control module 26 includes control logic for monitoring a personal electronic device 40 for the external communication. The hands-free control module 26 further includes control logic for sending a display data signal to the display 22. The display data signal generates graphical images on the display 22 indicating the content of the external communication received from the personal electronic device 40. Method 200 may then proceed to step 206.

In step 206, the hands-free control module 26 includes control logic for monitoring a vehicle control module 32 for a driving data signal indicating that the vehicle 18 is in a condition to receive input regarding operation. For example, in one embodiment if the vehicle control module 32 is a transmission control module, then the control module 26 sends the driving data signal to the hands-free control module 26 indicating that the vehicle 18 is in a condition to receive input regarding operation unless the driver intent sensors indicate that the shift lever is in a park "P" position. Alternatively, in another embodiment, the vehicle control module 32 is an engine control module that is in communication that indicates vehicle speed. Method 200 may then proceed to step 208.

In step 208, the hands-free control module 26 includes control logic for determining if the external communication received from the personal electronic device 40 is a specific type of external communication. For example, in one embodiment, the message delivery algorithm may only block text messages, but still generates graphical images on the display 22 indicating the telephone number or name of the caller. In the event that the external communication is blocked, method 200 then proceeds to step 210. In the event that the external communication is allowed, then method 200 proceeds to step 214, and the external communication is shown on the display 22.

In step 210, the hands-free control module 26 includes control logic for determining if a break-through string is present in the external communication. The break-through string is an indication that the external communication is to be shown on the display 22 even though the message delivery filter algorithm is activated. In the event that the message delivery filter algorithm is activated and the external communication does not contain the break-through string, then method 200 proceeds to step 212, where the external communication is stored in the memory of the hands-free control module 26. In step 212, the external communication is stored in the memory of the hands-free control module 26 until the message delivery filter algorithm is no longer activated. In the event that the external communication contains the break-through string, then method 200 proceeds to step 214.

In step 214, the hands-free control module 26 includes control logic for showing the external communication on the display 22, even though the message delivery filter algorithm is activated. Method 200 may then terminate, or return back to step 202.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A hands-free system for a vehicle, comprising:
 a vehicle control module communicatively coupled to at least one vehicle system for determining if the vehicle is in a condition to receive input regarding operation;
 a display;
 a hands-free control module in communication with the display, the vehicle control module, and a personal electronic device, the hands-free control module having a memory and a user input device including user selectable input controls; and
 a message delivery filter algorithm implemented via the hands-free control module configured to filter messages based on a state of the vehicle and a content of a message, the message delivery filter algorithm comprising control logic configured to:
 receive, via the user selectable input controls of the user input device, a user-configured break-through string configured to indicate if an external communication should be displayed on the display;

monitor the vehicle control module for a driving data signal indicating the vehicle is in the condition to receive input regarding operation;

monitor the personal electronic device for an external communication received by the personal electronic device from over a long-range network, the external communication comprising a user-generated message;

determine if the external communication contains the user-configured break-through string, a presence of the break-through string indicating that the user-generated message of the external communication is to be shown on the display even if the vehicle is in the condition to receive input regarding operation;

wherein, if the external communication contains the break-through string, send a display data signal to the display for generating graphical images that are shown on the display indicating the external communication contains the break-through string of the external communication; and wherein, if the external communication does not contain the break-through string, store the external communication contains the break-through string of the external communication in the memory of the control module if the vehicle control module sends the driving data signal indicating the vehicle is in the condition to receive input regarding operation.

2. The hands-free system of claim 1, wherein the break-through string is one of a telephone number, a caller's name, a word, a string of words, and a code.

3. The hands-free system of claim 1, wherein the external communication is in the form of one of a text message, a voice call, and an Internet-based application message.

4. The hands-free system of claim 1, wherein the control logic is configured to monitor a system control module for at least one driving condition.

5. The hands-free system of claim 4, wherein the at least one driving condition is at least one of a vehicle speed, vehicle location, the presence of passengers within the vehicle, proximity of the vehicle to another vehicle, the presence of a maneuver during driving, the presence of cruise control activation, time of day, usage of the personal electronic device, and external weather conditions.

6. The hands-free system of claim 4, wherein the control logic is configured to determine if the at least one driving condition meets at least one specified value, and wherein the control logic is configured to send the data signal to the display for generating graphical images that are shown on the display indicating the content of the external communication, wherein the data signal is sent if the external communication contains the break-through string and if the at least one driving condition meets the at least one specified value.

7. The hands-free system of claim 1, comprising a user input device in communication with the hands-free control module, wherein the user input device is configured for receiving an input.

8. The hands-free system of claim 7, the control logic is configured to monitor the user input device for the input, and wherein the hands-free control module includes a password stored in the memory of the hands-free control module, and wherein the control logic is configured to compare the input to the password stored in the memory, the message delivery filter algorithm being activated if the input is the same as the password.

9. The hands-free system of claim 1, wherein the hands-free control module is in wireless communication with a remotely located computing device, and wherein the remotely located computing device sends a data signal to the hands-free control module to activate the message delivery filter algorithm.

10. The hands-free system of claim 1, wherein the control logic is configured to communicate one of a text message and a pre-recorded telephone call to the personal electronic device indicating a driver is currently unavailable if the external communication does not contain the break-through string.

11. The hands-free system of claim 1, wherein the vehicle control module is one of an engine control module and a transmission control module.

12. The hands-free system of claim 1, wherein the control logic is configured to send an audio data signal to an audio system from the personal electronic device, wherein the audio data signal is sent to the audio system if the external communication contains the break-through string.

13. The hands-free system of claim 1, wherein the external communication is a first external communication, and the message delivery filter algorithm comprises logic configured to:

activate a message delivery filter with respect to a second external communication received at the personal electronic device, the message delivery filter configured to prevent the display of the second external communication on the display when an operator of the vehicle is engaged in the external communication via the personal electronic device.

14. A vehicle having a hands-free system, comprising:

a vehicle control module communicatively coupled to at least one vehicle system for determining if the vehicle is in a condition to receive input regarding operation;

a display;

a hands-free control module in communication with the display, the vehicle control module, and a personal electronic device, the hands-free control module having a memory and a user input device including user selectable input controls; and a message delivery filter algorithm implemented via the hands-free control module configured to filter messages based on a state of the vehicle and a content of a message, the message delivery filter algorithm comprising control logic configured to:

receive, via the user selectable input controls of the user input device, a user-configured break-through string configured to indicate if an external communication should be displayed on the display;

monitor the vehicle control module for a driving data signal indicating the vehicle is in the condition to receive input regarding operation;

monitor the personal electronic device for an external communication received by the personal electronic device from over a long-range network, the external communication comprising a user-generated message;

determine if the external communication contains the user-configured break-through string, a presence of the break-through string indicating that the user-generated message of the external communication is to be shown on the display even if the vehicle is in the condition to receive input regarding operation;

wherein, if the external communication contains the break-through string send a display data signal to the display for generating graphical images that are shown on the display indicating the external communication contains the break-through string of the external communication; and wherein, if the external communication does not contain the break-through string, store the external communication contains the break-through string of the external communication in the memory of the control module if the vehicle control module sends the driving data signal indicating the vehicle is in the condition to receive input regarding operation; and communicate one of a text message and a pre-recorded telephone call to the personal electronic device indicating a driver is currently unavailable if the external communication does not contain the break-through string.

15. The vehicle of claim 14, wherein the break-through string is one of a telephone number, a caller's name, a word, a string of words, and a code.

16. The vehicle of claim 14, wherein the external communication is in the form of one of a text message, a voice call, and an Internet-based application message.

17. The vehicle of claim 14, wherein the control logic is configured to monitor the vehicle for at least one driving condition, and the at least one driving condition is at least one of a threshold vehicle speed, vehicle location, the presence of passengers within the vehicle, proximity of the vehicle to another vehicle, the presence of a maneuver during driving, the presence of cruise control activation, time of day, usage of the personal electronic device, and external weather conditions.

18. The vehicle of claim 17, wherein the control logic is configured to determine if the at least one driving condition meets at least one specified value, and wherein the control logic is configured to send the data signal to the display for generating graphical images that are shown on the display indicating the content of the external communication, wherein the data signal is sent if the external communication contains the break-through string and if the at least one driving condition meets the at least one specified value.

19. The vehicle of claim 14, comprising a user input device in communication with the hands-free control module, wherein the user input device is configured for receiving an input.

20. A vehicle having a hands-free system, comprising:
a vehicle control module communicatively coupled to at least one vehicle system for determining if the vehicle is in a condition to receive input regarding operation;
a display;
an audio system;
a user input device configured for receiving a password and a user-configured break-through string cg to indicate if an external communication should be displayed on the display; and
a hands-free control module in communication with the display, the vehicle control module, the audio system, and a personal electronic device, the hands-free control module receives an external communication from the personal electronic device, the external communication received by the personal electronic device from over a long-range network, and the external communication is a user-generated message in the form of one of a text message, a voice call, and an Internet-based application message, the hands-free control module having a memory including a stored password;
a message delivery filter algorithm implemented via the hands-free control module configured to filter messages based on a state of the vehicle and a content of a message, the message delivery filter algorithm comprising control logic configured to:
selectively block elements of the external communication from being presented on the display based on a type of the external communication as defined by the break-through string while allowing other elements of the external communication to be presented on the display;
monitor the user input device for the password and the break-through string;
compare the password to the stored password in the memory, the message delivery filter algorithm being activated if the password is the same as the stored password;
monitor the vehicle control module for a driving data signal indicating the vehicle is in the condition to receive input regarding operation;
monitor the personal electronic device for the external communication;
determine if the content of the external communication contains the user-configured break-through string, a presence of the break-through string indicating that the content of the external communication, including selectively blocked elements, is to be shown on the display even if the vehicle is in the condition to receive input regarding operation, and wherein the break-through string is one of a telephone number, a caller's name, a word, a string of words, and a code;
send a display data signal to the display for generating graphical images that are shown on the display indicating the content of the external communication, wherein the display data signal is sent if the external communication contains the break-through string;
send an audio data signal to the audio system from the personal electronic device, wherein the audio data signal is sent to the audio system if the external communication contains the break-through string;
store the external communication in the memory of the control module if the external communication does not contain the break-through string and if the vehicle control module sends the driving data signal indicating the vehicle is in the condition to receive input regarding operation; and
communicate one of a text message and a pre-recorded telephone call to the personal electronic device indicating a driver is currently unavailable if the external communication does not contain the break-through string.

* * * * *